United States Patent
Redpath

(10) Patent No.: US 7,089,559 B2
(45) Date of Patent: *Aug. 8, 2006

(54) METHOD, APPARATUS, AND PROGRAM FOR CHAINING SERVER APPLICATIONS

(75) Inventor: Richard J. Redpath, Cary, NC (US)

(73) Assignee: International Business Machines Corporation, Armonk, NY (US)

(*) Notice: Subject to any disclaimer, the term of this patent is extended or adjusted under 35 U.S.C. 154(b) by 713 days.

This patent is subject to a terminal disclaimer.

(21) Appl. No.: 09/919,257

(22) Filed: Jul. 31, 2001

(65) Prior Publication Data

US 2003/0028678 A1 Feb. 6, 2003

(51) Int. Cl.
G06F 9/46 (2006.01)
G06F 9/45 (2006.01)
G06F 9/44 (2006.01)
G06F 17/20 (2006.01)
G10L 11/00 (2006.01)

(52) U.S. Cl. .................. 718/106; 717/136; 717/168; 717/170; 704/1; 704/2; 704/278

(58) Field of Classification Search ........ 718/100–108; 717/136–170; 704/1, 2, 278
See application file for complete search history.

(56) References Cited

U.S. PATENT DOCUMENTS

| | | | |
|---|---|---|---|
| 4,503,499 A * | 3/1985 | Mason et al. ............. 718/101 |
| 5,333,304 A * | 7/1994 | Christensen et al. ......... 714/25 |
| 5,410,703 A * | 4/1995 | Nilsson et al. ............. 717/168 |
| 5,490,061 A | 2/1996 | Tolin et al. ............ 364/419.02 |
| 5,493,525 A * | 2/1996 | Yang et al. ................. 708/710 |
| 5,592,588 A * | 1/1997 | Reekes et al. ............. 704/278 |
| 5,873,055 A | 2/1999 | Okunishi ....................... 704/2 |
| 6,108,714 A * | 8/2000 | Kumagai et al. ............ 719/310 |
| 6,163,785 A | 12/2000 | Carbonell et al. .......... 707/530 |
| 6,233,545 B1 * | 5/2001 | Datig ............................. 704/2 |
| 6,243,860 B1 * | 6/2001 | Holland ....................... 717/141 |
| 6,275,789 B1 | 8/2001 | Moser et al. .................. 704/7 |
| 6,341,372 B1 * | 1/2002 | Datig ........................ 717/136 |
| 6,425,118 B1 * | 7/2002 | Molloy et al. .............. 717/136 |
| 6,434,590 B1 * | 8/2002 | Blelloch et al. ............ 718/102 |
| 6,470,306 B1 | 10/2002 | Pringle et al. ................. 704/3 |
| 6,748,591 B1 * | 6/2004 | Lewallen ..................... 717/170 |
| 6,848,103 B1 * | 1/2005 | Larsson et al. ............. 718/106 |
| 2002/0198697 A1 * | 12/2002 | Datig ............................ 704/1 |

* cited by examiner

Primary Examiner—Meng-Al T. An
Assistant Examiner—Jennifer N. To
(74) Attorney, Agent, or Firm—Yee & Associates, P.C.; A. Bruce Clay

(57) ABSTRACT

A mechanism is provided for chaining server applications. A chaining module is provided that receives a series of server applications and chains them together passing the output of one to the input of the next. The series of server applications may be passed to the chaining module in a chain option. A properties file may be provided to register names of server applications. A name may be associated with the chaining module and the options may be specified in the properties file. Thus, a chain of server applications may be registered by name.

12 Claims, 4 Drawing Sheets

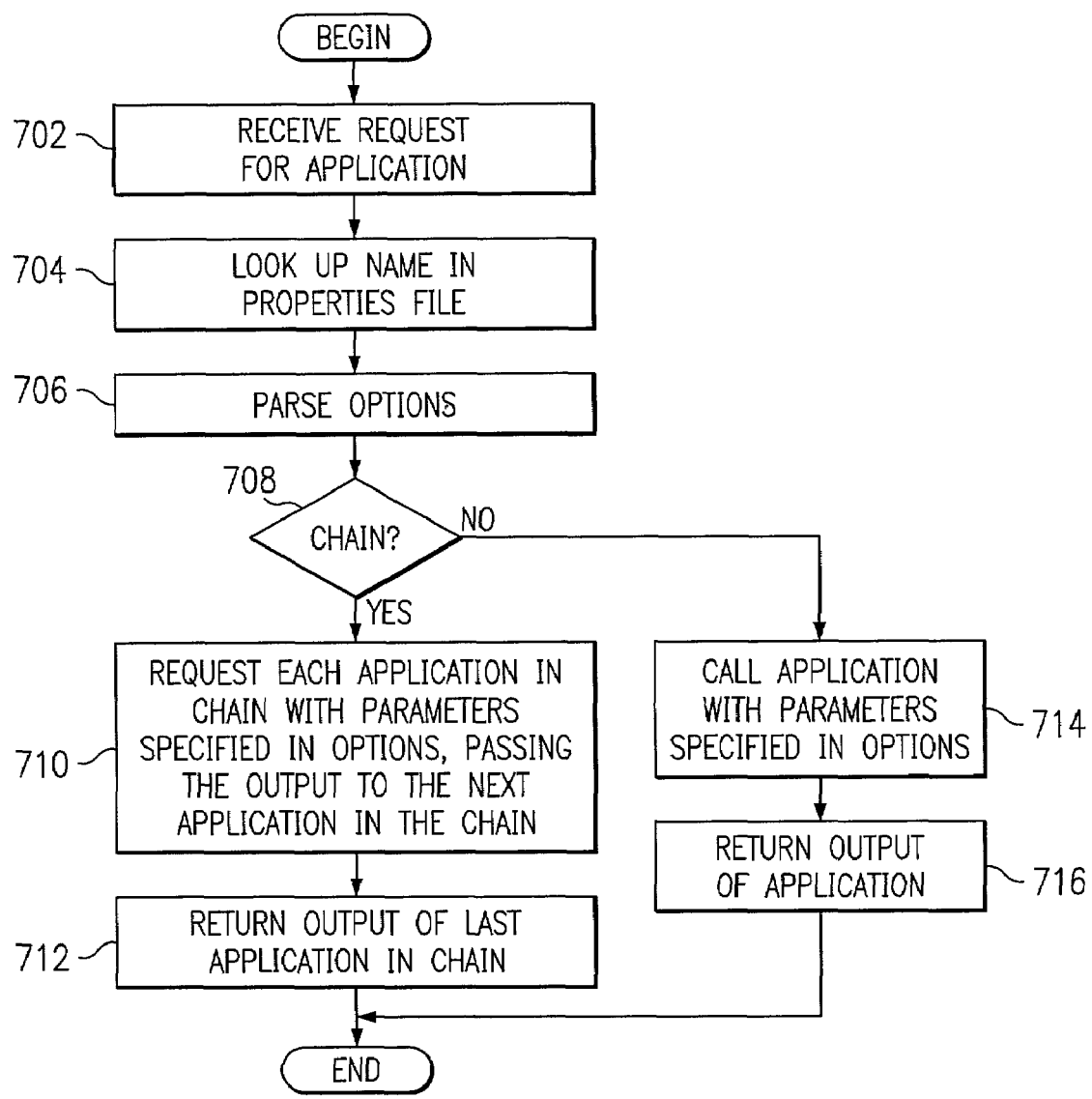

METHOD, APPARATUS, AND PROGRAM FOR CHAINING SERVER APPLICATIONS

RELATED APPLICATIONS

The present application is related to commonly assigned and U.S. patent application Ser. No. 09/919,235 (now U.S. Pat. No. 6,993,472) entitled "METHOD, APPARATUS, AND PROGRAM FOR CHAINING MACHINE TRANSLATION ENGINES TO CONTROL ERROR PROPAGATION", filed on even date herewith, and hereby incorporated by reference.

BACKGROUND OF THE INVENTION

1. Field of the Invention

The present invention relates to data processing systems and, in particular, to providing applications on servers in a network. Still more particularly, the present invention provides a method, apparatus, and program for chaining server applications.

2. Background of the Invention

Machine translation (MT) is a computer technology wherein a computer software program or computer hardware translates a textual source human language into some textual target human language. An example is translation from English to German. Machine translation services are provided for many pairs of languages. Typically, a language pair supplier may develop language pair engines that can provide translation for common language pairs. However, to provide a machine translation for every possible combination of source language and target language would require an extremely large amount of time and code. Thus, it is unrealistic to provide a language pair for every possible combination, especially considering that demand for most pairs may be very low or nonexistent.

Machine translation may be provided for some pairs by chaining pairs together. For example, translation from German to French may be provided by chaining a German-to-English translation with an English-to-French translation. Providers may also wish to add other applications, such as verification or statistics services, in a chain. For example, a provider may develop a new application for counting the number of words to be translated. This application may be added to the beginning of the chain. However, to do so may require specific modifications to the server software.

Therefore, it would be advantageous to provide an improved mechanism for chaining server applications.

SUMMARY OF THE INVENTION

The present invention provides a mechanism for chaining server applications. A chaining module is provided that receives a series of server applications and chains them together passing the output of one to the input of the next. The series of server applications may be passed to the chaining module in a chain option. A properties file may be provided to register names of server applications. A name may be associated with the chaining module and the options may be specified in the properties file. Thus, a chain of server applications may be registered by name.

BRIEF DESCRIPTION OF THE DRAWINGS

The novel features believed characteristic of the invention are set forth in the appended claims. The invention itself, however, as well as a preferred mode of use, further objectives and advantages thereof, will best be understood by reference to the following detailed description of an illustrative embodiment when read in conjunction with the accompanying drawings, wherein:

FIG. 7 is a flowchart illustrating the operation of a server with chaining in accordance with a preferred embodiment of the present invention.

DETAILED DESCRIPTION OF THE PREFERRED EMBODIMENT

Figure 1:
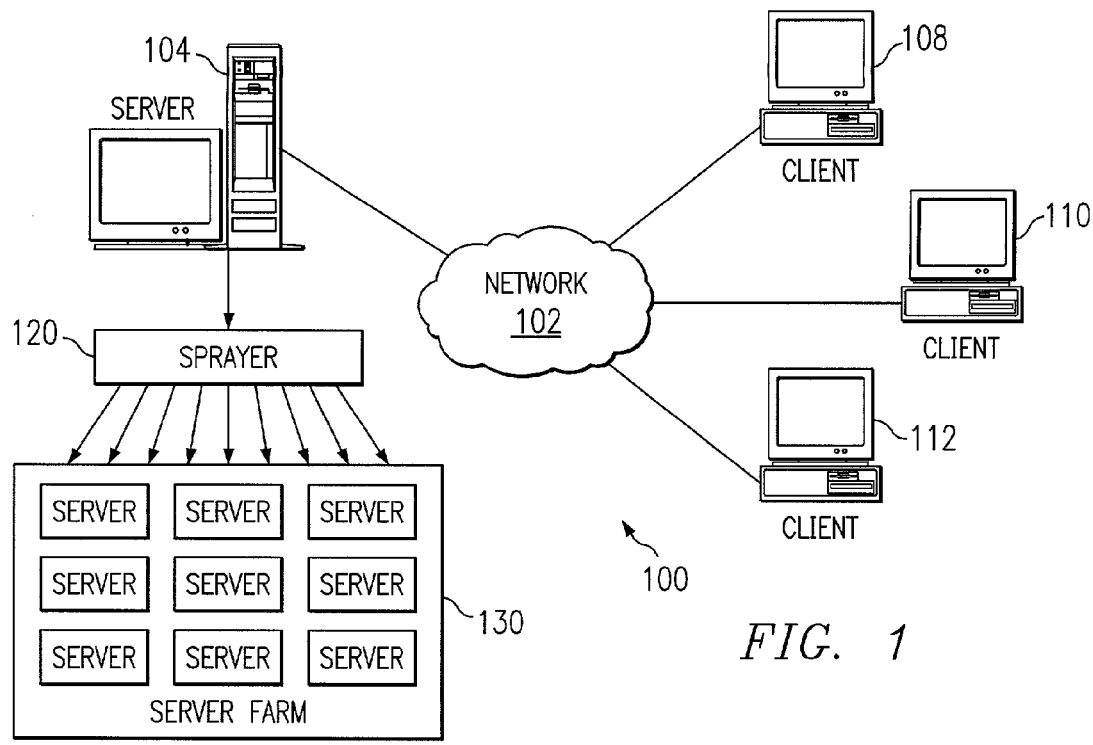
FIG. 1 depicts a pictorial representation of a network of data processing systems in which the present invention may be implemented.

With reference now to the figures, FIG. 1 depicts a pictorial representation of a network of data processing systems in which the present invention may be implemented. Network data processing system 100 is a network of computers in which the present invention may be implemented. Network data processing system 100 contains a network 102, which is the medium used to provide communications links between various devices and computers connected together within network data processing system 100. Network 102 may include connections, such as wire, wireless communication links, or fiber optic cables.

In the depicted example, server 104 is connected to network 102. In addition, clients 108, 110, and 112 are connected to network 102. These clients 108, 110, and 112 may be, for example, personal computers or network computers. In the depicted example, server 104 provides data, such as documents, to clients 108–112. In a specific example, server 104 may be a Web server. Clients 108, 110, and 112 are clients to server 104. Network data processing system 100 may include additional servers, clients, and other devices not shown. In the depicted example, network data processing system 100 is the Internet with network 102 representing a worldwide collection of networks and gateways that use the TCP/IP suite of protocols to communicate with one another. At the heart of the Internet is a backbone of high-speed data communication lines between major nodes or host computers, consisting of thousands of commercial, government, educational and other computer systems that route data and messages. Of course, network data processing system 100 also may be implemented as a number of different types of networks, such as for example, an intranet, a local area network (LAN), or a wide area network (WAN). FIG. 1 is intended as an example, and not as an architectural limitation for the present invention.

To provide service on a scalable range server farm 130 may be used. Server 104 may direct requests from clients to one of the servers in server farm 130 through sprayer 120. The sprayer distributes requests to one of the servers in the server farm and may perform other functions, such as load balancing. Each server in the server farm may run all the available applications. For example, each server may run a German-to-English translation, an English-to-Spanish translation, and a verification application for verifying whether the requesting client is authorized to access each application.

Figure 2:
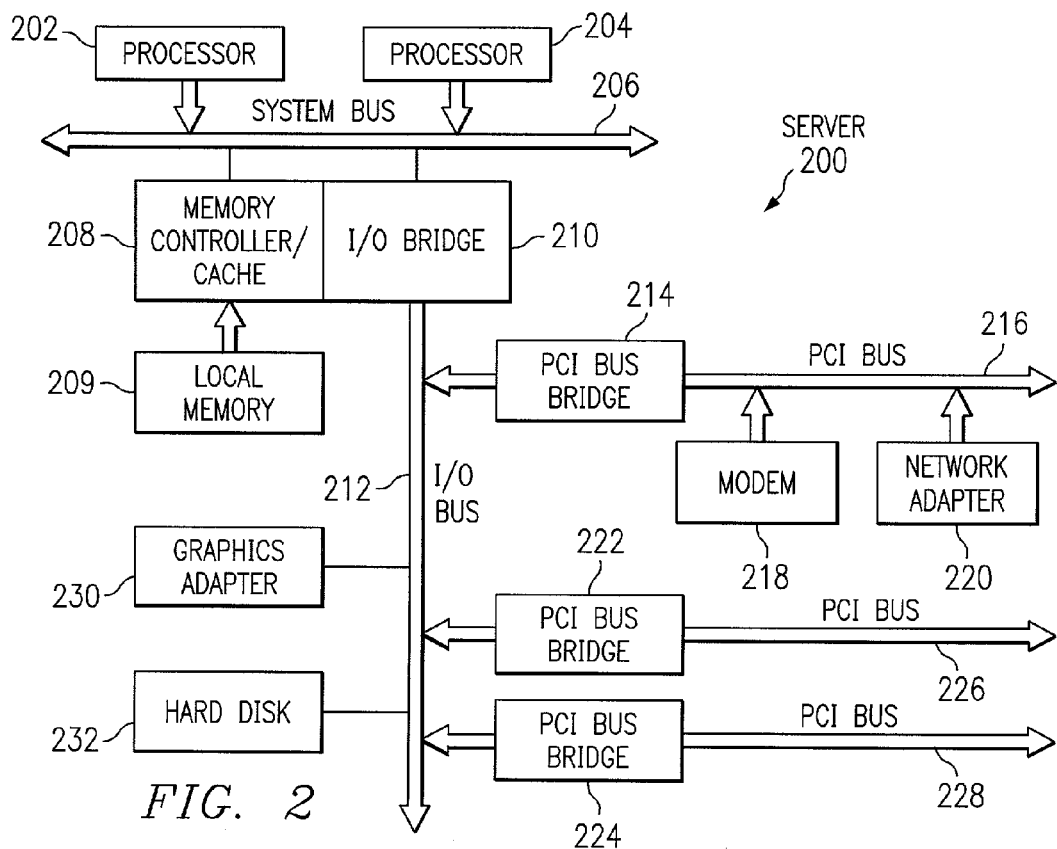
FIG. 2 is a block diagram of a data processing system that may be implemented as a server in accordance with a preferred embodiment of the present invention.

Referring to FIG. 2, a block diagram of a data processing system that may be implemented as a server, such as server 104 in FIG. 1, is depicted in accordance with a preferred embodiment of the present invention. Data processing system 200 may be a symmetric multiprocessor (SMP) system including a plurality of processors 202 and 204 connected to system bus 206. Alternatively, a single processor system may be employed. Also connected to system bus 206 is memory controller/cache 208, which provides an interface to local memory 209. I/O bus bridge 210 is connected to system bus 206 and provides an interface to I/O bus 212. Memory controller/cache 208 and I/O bus bridge 210 may be integrated as depicted.

Peripheral component interconnect (PCI) bus bridge 214 connected to I/O bus 212 provides an interface to PCI local bus 216. A number of modems may be connected to PCI local bus 216. Typical PCI bus implementations will support four PCI expansion slots or add-in connectors. Communications links to clients 108–112 in FIG. 1 may be provided through modem 218 and network adapter 220 connected to PCI local bus 216 through add-in boards.

Additional PCI bus bridges 222 and 224 provide interfaces for additional PCI local buses 226 and 228, from which additional modems or network adapters may be supported. In this manner, data processing system 200 allows connections to multiple network computers. A memory-mapped graphics adapter 230 and hard disk 232 may also be connected to I/O bus 212 as depicted, either directly or indirectly.

Those of ordinary skill in the art will appreciate that the hardware depicted in FIG. 2 may vary. For example, other peripheral devices, such as optical disk drives and the like, also may be used in addition to or in place of the hardware depicted. The depicted example is not meant to imply architectural limitations with respect to the present invention.

The data processing system depicted in FIG. 2 may be, for example, an IBM e-Server pseries system, a product of International Business Machines Corporation in Armonk, N.Y., running the Advanced Interactive Executive (AIX) operating system or LINUX operating system.

Figure 3:
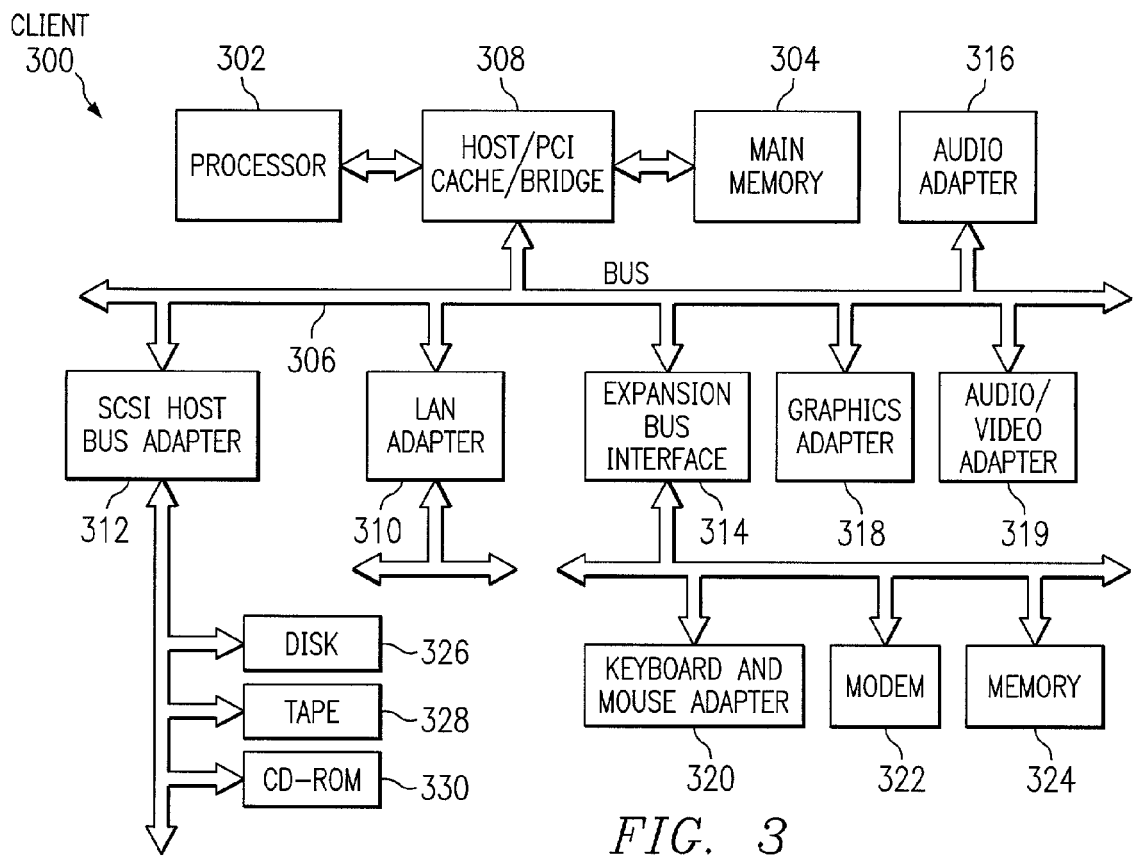
FIG. 3 is a block diagram illustrating a data processing system in which the present invention may be implemented.

With reference now to FIG. 3, a block diagram illustrating a data processing system is depicted in which the present invention may be implemented. Data processing system 300 is an example of a client computer. Data processing system 300 employs a peripheral component interconnect (PCI) local bus architecture. Although the depicted example employs a PCI bus, other bus architectures such as Accelerated Graphics Port (AGP) and Industry Standard Architecture (ISA) may be used. Processor 302 and main memory 304 are connected to PCI local bus 306 through PCI bridge 308. PCI bridge 308 also may include an integrated memory controller and cache memory for processor 302. Additional connections to PCI local bus 306 may be made through direct component interconnection or through add-in boards. In the depicted example, local area network (LAN) adapter 310, SCSI host bus adapter 312, and expansion bus interface 314 are connected to PCI local bus 306 by direct component connection. In contrast, audio adapter 316, graphics adapter 318, and audio/video adapter 319 are connected to PCI local bus 306 by add-in boards inserted into expansion slots. Expansion bus interface 314 provides a connection for a keyboard and mouse adapter 320, modem 322, and additional memory 324. Small computer system interface (SCSI) host bus adapter 312 provides a connection for hard disk drive 326, tape drive 328, and CD-ROM drive 330. Typical PCI local bus implementations will support three or four PCI expansion slots or add-in connectors.

An operating system runs on processor 302 and is used to coordinate and provide control of various components within data processing system 300 in FIG. 3. The operating system may be a commercially available operating system, such as Windows 2000, which is available from Microsoft Corporation. An object oriented programming system such as Java may run in conjunction with the operating system and provide calls to the operating system from Java programs or applications executing on data processing system 300. "Java" is a trademark of Sun Microsystems, Inc. Instructions for the operating system, the object-oriented operating system, and applications or programs are located on storage devices, such as hard disk drive 326, and may be loaded into main memory 304 for execution by processor 302.

Those of ordinary skill in the art will appreciate that the hardware in FIG. 3 may vary depending on the implementation. Other internal hardware or peripheral devices, such as flash ROM (or equivalent nonvolatile memory) or optical disk drives and the like, may be used in addition to or in place of the hardware depicted in FIG. 3. Also, the processes of the present invention may be applied to a multiprocessor data processing system.

As another example, data processing system 300 may be a stand-alone system configured to be bootable without relying on some type of network communication interface, whether or not data processing system 300 comprises some type of network communication interface. As a further example, data processing system 300 may be a personal digital assistant (PDA) device, which is configured with ROM and/or flash ROM in order to provide non-volatile memory for storing operating system files and/or user-generated data.

The depicted example in FIG. 3 and above-described examples are not meant to imply architectural limitations. For example, data processing system 300 also may be a notebook computer or hand held computer in addition to taking the form of a PDA. Data processing system 300 also may be a kiosk or a Web appliance.

Returning to FIG. 1, each server in server farm 130 may include all the server applications. When a new server application is developed, the application must be added to every server in the server farm. Furthermore, a new application may be developed that is to be used with one or more of the existing applications. For example, a supplier may develop a customer verification application that receives a customer number and determine if the customer is authorized to use a given server application. The new customer verification application may be added to each of the existing server applications. However, to modify each existing server application to be chained with another application may be cumbersome, particularly considering the potentially large number of servers in a server farm.

In accordance with a preferred embodiment of the present invention, a chaining module is provided that receives a series of server applications and chains them together passing the output of one to the input of the next. The series of server applications may be passed to the chaining module in a chain option. A properties file may be provided to register names of server applications. A name may be associated with the chaining module and the options may be specified in the properties file. Thus, a chain of server applications may be registered by name.

Figure 4:
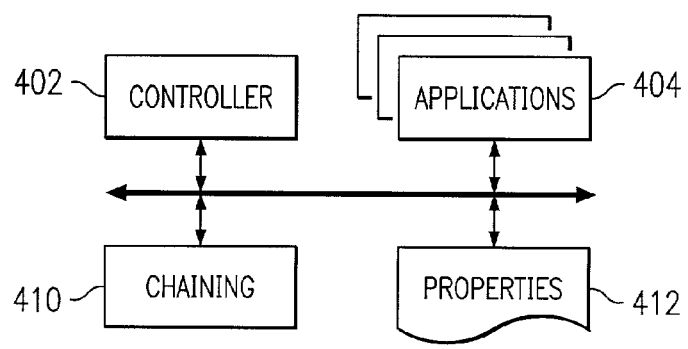
FIG. 4 is a block diagram illustrating the functional components of a server in accordance with a preferred embodiment of the present invention.

With reference to FIG. 4, a block diagram illustrating the functional components of a server is shown in accordance with a preferred embodiment of the present invention. The server includes a controller 402 and applications 404. The controller controls the execution of applications 404. Applications 404 may provide services, such as machine translation, that are provided by the server. Applications may be used in conjunction with one another. For example, one application may provide a machine translation service that translates text from a source language to a target language. Another application may provide a statistics service that counts the number of words in the target language text.

The server also includes chaining module 410. The chaining module allows applications to be used together without requiring modification of the existing applications for passing the output of one application to the input of the next application in the chain. For example, to call a German (Deutsche (de)) to English translation engine (deen) chained with an English to French translation engine (enfr), a client may simply call the chain module to chain deen and enfr.

The server may also include properties 412. Each of applications 404 and the chaining module 410 are registered in the properties file by establishing a name and associating an application to the name. A provider may also register a chain of applications in properties 412 by establishing a name and associating the chain module to that name setting the chain of applications to be chained using a chain option recognized by the chain module. Properties 412 may be embodied as a file stored on the server.

The functional components illustrated in FIG. 4 may be embodied in hardware, software, or a combination of hardware and software. For example, controller 402 may be a processor, such as processors 202, 204 in FIG. 2, and applications 404 and chaining module 410 may be software executing on the processor. The functional components of the server may also be implemented as firmware.

Figure 5:
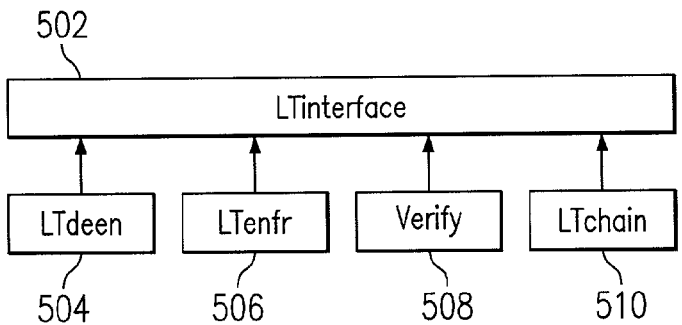
FIG. 5 is a diagram illustrating a software configuration for chaining server applications in accordance with a preferred embodiment of the present invention.

Turning now to FIG. 5, a diagram is shown illustrating a software configuration for chaining server applications in accordance with a preferred embodiment of the present invention. Each server may include LTinterface 502. LTinterface identifies methods that may be used to develop an application for the server. Therefore, a developer may simply write an application that implements LTinterface. In other words, the developer writes code for the applicable methods identified in the LTinterface. Particularly, LTinterface may define the methods to be used for a language translation service.

As an example, language translation application "LTdeen" 504 and language translation application "LTenfr" 506 implement LTinterface 502. LTdeen is a German (Deutsche (de)) to English (en) language translation application and LTenfr is an English to French (fr) language translation application. Each of the LTdeen and LTenfr classes implements LTinterface and provides the code for the necessary methods for language translation.

As a further example, customer verification application "LTverify" 508 implements LTinterface to provide an application for verifying whether a customer is authorized to access a server application. The LTverify application can provide denial of service through account checking. The LTverify class 508 checks the customer account option (*customer) and returns null for service if an account does not exist for that customer. This application may be inserted at the beginning of a chain and pass an output to the next application in the chain only if the customer has a valid account. Otherwise, the next application in the chain will receive a null value and will not operate.

The chaining module "LTchain" 510 implements LTinterface 502. The LTchain class provides an option (*chain) to specify the engines (applications) to call and their parameters. An example string for ltBeginTranslation() follows:

ltBeginTranslation("*chain=LTdeen(*format=html), LTenfr");

In this example, the LTchain class will call the LTdeen engine with the parameter "*format=html" and then call the LTenfr engine with no parameters. Thus, a client may use the chaining module to chain server applications.

The specific applications shown in FIG. 5 are exemplary and other applications may be provided using LTinterface 502. For example, statistics applications may be developed using the LTinterface to count words to be translated for example.

Figure 6A:
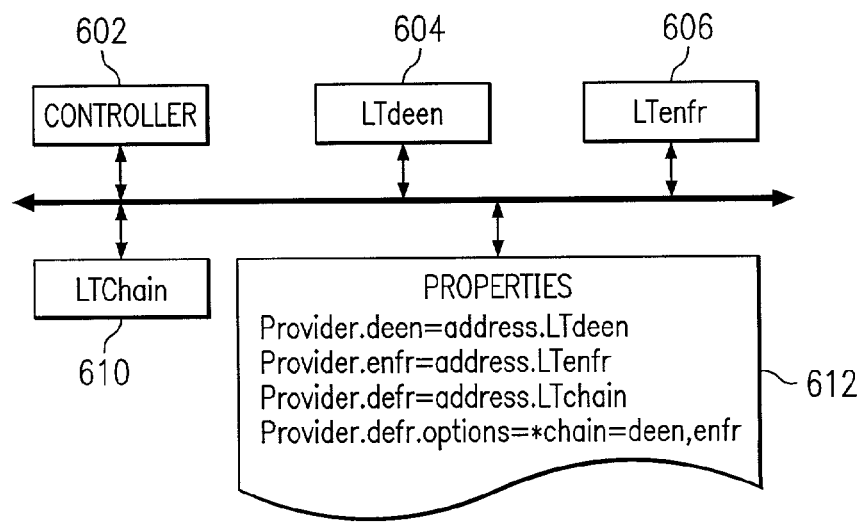
FIGS. 6A and 6B illustrate the functional components of specific examples of a server in accordance with a preferred embodiment of the present invention.
Figure 6B:
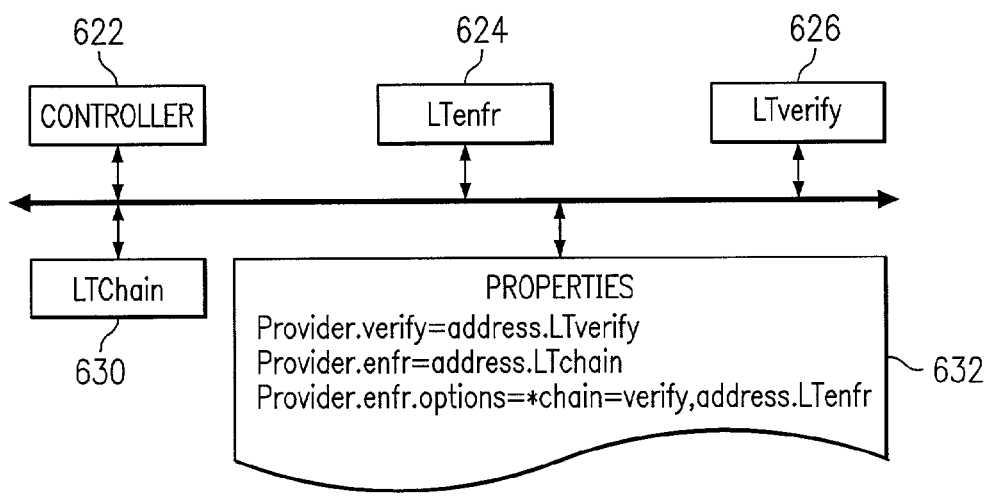

Next, FIGS. 6A and 6B illustrate the functional components of specific examples of a server in accordance with a preferred embodiment of the present invention. Particularly, with reference to FIG. 6A, the server includes a controller 602, language translation engine LTdeen 604, and language translation engine LTenfr 606. LTdeen provides a machine translation service that translates text from German (Deutsche (de)) to English (en). LTenfr provides a machine translation service that translates text from English to French (fr).

The server also includes chaining module 610. The chaining module allows applications to be used together without requiring specific code for passing the output of one application to the input of the next application in the chain. The server also includes properties 612. LTdeen 604 is registered in the properties file by establishing a name and associating an application to the name. The property keyword "provider" is concatenated with the service insignia to form the name. The text "Provider.deen=address.LTdeen" is used to register the LTdeen application. LTenfr 606 is registered using the text "Provider.enfr=address.LTenfr."

A new service may be registered by establishing a name and associating the chaining module to the name in properties 612. For example, a German to French translation engine may be registered using the text "Provider.defr=address.LTchain" and setting the chaining options using the text "Provider.defr.options=*chain=deen, enfr."

Turning now to FIG. 6B, the server includes a controller 622, language translation engine LTenfr 624, and customer verification application "LTverify" 626. LTenfr provides a machine translation service that translates text from English (en) to French (fr). The LTverify application provides denial of service through account checking.

The server also includes chaining module 630. The chaining module allows applications to be used together without requiring specific code for passing the output of one application to the input of the next application in the chain. The server also includes properties 632. LTverify 626 is registered in the properties file by establishing a name and associating an application to the name. The property keyword "provider" is concatenated with the service insignia to form the name. The text "Provider.verify=address.LTverify" is used to register the LTverify application.

A chaining service may be registered by establishing a name and associating the chaining module to the name in properties 632. For example, the English to French translation engine may be registered using the text "Provider.enfr=address.LTchain" and setting the chaining options using the text "Provider.enfr.options=*chain=verify, address.LTenfr." Thus, a supplier may add the customer verification engine to existing applications without having to modify the server application software. Instead, the supplier may modify the configurations of server applications easily using chaining module 630 and properties 632.

With reference now to FIG. 7, a flowchart illustrating the operation of a server with chaining is shown in accordance with a preferred embodiment of the present invention. The process begins and receives a request for a server application (step 702). The process then looks up the name in the properties file (step 704) and parses the options (step 706). Next, a determination is made as to whether the application chaining module (step 708).

If the application is the chaining module, the process requests each application in the chain, as specified in the chain option, passing the output of each application to the input of the next application (step 710). Thereafter, the process returns the output of the last application in the chain (step 712) and ends.

For each application in the chain the process shown in FIG. 7 may be executed. Therefore, an application in the chain may also specify the chaining module with different applications in the chain. For example, a chain of a German to English translation service and an English to French translation service may be specified. The German to English translation service may be registered as a chain of a statistics application and the "LTdeen" application 604 in FIG. 6A. The English to French application may be registered as a chain of the "LTenfr" application 624 and the "verify" application 626 in FIG. 6B.

If the application is not the chaining module in step 708, the process executes the application with the parameters specified in the options (step 714). Thereafter, the process returns the output of the application (step 716) and ends.

Thus, the present invention solves the disadvantages of the prior art by providing a mechanism for chaining server applications. A chaining module is provided that receives a series of server applications and chains them together passing the output of one to the input of the next. The series of server applications may be passed to the chaining module in a chain option. A client may call the chaining module to chain server applications. Also, a properties file may be provided to register names of server applications. A name may be associated with the chaining module and the options may be specified in the properties file. Thus, a chain of server applications may be registered by name and the chain may be called by the client by name.

The properties file may use the chain option for frequently used chains, such as denial of service, to count words to charge for translation, or frequently used language translation engine combinations. However, the combination of languages that may be defined by the client may be too large for the server to register by name. However, any combination of existing server applications may be called by the client using the chain module of the present invention.

It is important to note that while the present invention has been described in the context of a fully functioning data processing system, those of ordinary skill in the art will appreciate that the processes of the present invention are capable of being distributed in the form of a computer readable, recordable-type medium of instructions and a variety of forms. Examples of computer readable, recordable-type media include recordable-type media such as a floppy disc, a hard disk drive, a RAM, and CD-ROMs.

The description of the present invention has been presented for purposes of illustration and description, and is not intended to be exhaustive or limited to the invention in the form disclosed. Many modifications and variations will be apparent to those of ordinary skill in the art. The embodiment was chosen and described in order to best explain the principles of the invention, the practical application, and to enable others of ordinary skill in the art to understand the invention for various embodiments with various modifications as are suited to the particular use contemplated.

What is claimed is:

1. A method, in a server computer, for chaining applications, the method comprising:

storing in a properties file a service name that identifies a service associated with a chaining module and an option that associates the service name with a series of applications;

receiving a request from a requesting application for the service;

parsing the properties file to identify the series of applications and to determine a last application in the series of applications;

activating the chaining module to issue a request to each application, within the series of applications, in order, and to pass an output of each application to an input of the next application in the series until an output of the last application in the series of applications is received by the chaining module; and responsive to receiving an output of the last application in the series of applications at the chaining module, returning the output of the last application to the requesting application as a result of the service.

2. The method of claim 1, wherein a first application in the series of applications is a customer verification application.

3. The method of claim 2, wherein a second application in the series of applications is a natural language translation engine.

4. A method, in a server computer, for chaining applications, the method comprising:

storing in a properties file a service name that identifies a service associated with a chaining module and an option that associates the service name with a series of applications;

receiving a request from a requesting application for the service;

parsing the properties file to identify the series of applications and to determine a last application in the series of applications;

activating the chaining module to issue a request to each application within the series of applications, in order, and to pass an output of each application to an input of the next application in the series until an output of the last application in the series of applications is received by the chaining module; and responsive to receiving an output of the last application in the series of applications at the chaining module, returning the output of the last application to the requesting application as a result of the service, wherein a first application in the series of applications is a first natural language translation engine that translates an input from a first natural language to a second natural language and wherein a second application in the series of applications is a second natural language translation engine that translates an input from the natural second language to a third natural language.

5. An apparatus in a server computer comprising:

a processor; and a memory coupled to the processor, wherein the memory has stored therein computer usable program code for chaining applications, wherein the computer usable program code is executable on the processor to:
  store in a properties file a service name that identifies a service associated with a chaining module and an option that associates the service name with a series of applications;
  receive a request from a requesting application for the service;
  parse the properties file to identify the series of applications and to determine a last application in the series of applications;
  activate the chaining module to issue a request to each application within the series of applications, in order, and to pass an output of each application to an input of the next application in the series until an output of the last application in the series of applications is received by the chaining module; and
  responsive to receiving an output of the last application in the series of applications at the chaining module, return the output of the last application to the requesting application as a result of the service.

6. The apparatus of claim 5, wherein a first application in the series of applications is a customer verification application.

7. The apparatus of claim 6, wherein a second application in the series of applications is a natural language translation engine.

8. An apparatus in a server computer comprising:
a processor; and
a memory coupled to the processor, wherein the memory has stored therein computer usable program code for chaining applications, wherein the computer usable program code is executable on the processor to:
  store in a properties file a service name that identifies a service associated with a chaining module and an option that associates the service name with a series of applications;
  receive a request from a requesting application for the service;
  parse the properties file to identify the series of applications and to determine a last application in the series of applications;
  activate the chaining module to issue a request to each application within the series of applications, in order, and to pass an output of each application to an input of the next application in the series until an output of the last application in the series of applications is received by the chaining module; and
  responsive to receiving an output of the last application in the series of applications at the chaining module, return the output of the last application to the requesting application as a result of the service, wherein a first application in the series of applications is a first natural language translation engine that translates an input from a first natural language to a second natural language and wherein a second application in the series of applications is a second natural language translation engine that translates an input from the natural second language to a third natural language.

9. A computer program product comprising:
a computer usable medium having computer usable program code for chaining applications, the computer usable program code comprising:
  computer usable program code for storing in a properties file a service name that identifies a service associated with a chaining module and an option that associates the service name with a series of applications;
  computer usable program code for receiving a request from a requesting application for the service;
  computer usable program code for parsing the properties file to identify the series of applications and to determine a last application in the series of applications;
  computer usable program code for activating the chaining module to issue a request to each application within the series of applications, in order, and to pass an output of each application to an input of the next application in the series until an output of the last application in the series of applications is received by the chaining module; and
  computer usable program code, responsive to receiving an output of the last application in the series of applications at the chaining module, for returning the output of the last application to the requesting application as a result of the service.

10. The computer program product of claim 9, wherein a first application in the series of applications is a customer verification application.

11. The computer program product of claim 10, wherein a second application in the series of applications is a natural language translation engine.

12. A computer program product comprising:
a computer usable medium having computer usable program code for chaining applications, the computer usable program code comprising:
  computer usable program code for storing in a properties file a service name that identifies a service associated with a chaining module and an option that associates the service name with a series of applications;
  computer usable program code for receiving a request from a requesting application for the service;
  computer usable program code for parsing the properties file to identify the series of applications and to determine a last application in the series of applications;
  computer usable program code for activating the chaining module to issue a request to each application within the series of applications, in order, and to pass an output of each application to an input of the next application in the series until an output of the last application in the series of applications is received by the chaining module; and
  computer usable program code, responsive to receiving an output of the last application in the series of applications at the chaining module, for returning the output of the last application to the requesting application as a result of the service, wherein a first application in the series of applications is a first natural language translation engine that translates an input from a first natural language to a second natural language and wherein a second application in the series of applications is a second natural language translation engine that translates an input from the natural second language to a third natural language.

* * * * *